United States Patent [19]

Heess et al.

[11] Patent Number: 4,714,300

[45] Date of Patent: Dec. 22, 1987

[54] PRESSURE MODULATOR FOR ANTI-SKID BRAKE SYSTEMS

[75] Inventors: Gerhard Heess, Tamm, Fed. Rep. of Germany; Dean Karnopp, Davis, Calif.; Anton van Zanten, Ditzingen, Fed. Rep. of Germany

[73] Assignee: Robert Bosch GmbH, Stuttgart, Fed. Rep. of Germany

[21] Appl. No.: 888,659

[22] Filed: Jul. 23, 1986

[30] Foreign Application Priority Data

Jul. 23, 1985 [DE] Fed. Rep. of Germany ....... 3526189

[51] Int. Cl.⁴ ................................................ B60T 8/42
[52] U.S. Cl. ...................................... 303/115; 303/61; 303/119
[58] Field of Search .............. 188/349, 181 A, 181 R; 303/61, 103, 113, 115, 116, 119

[56] References Cited

U.S. PATENT DOCUMENTS

| | | | |
|---|---|---|---|
| 3,574,417 | 4/1971 | Howard et al. | 303/119 X |
| 3,614,176 | 10/1971 | Holst et al. | 303/61 |
| 3,617,098 | 11/1972 | Leiber | 303/119 |
| 3,690,736 | 9/1972 | Smirl et al. | |
| 3,719,401 | 3/1973 | Peruglia | 303/119 |
| 3,731,979 | 5/1973 | Mikaila | |
| 4,068,904 | 1/1978 | Blomberg et al. | 303/115 |
| 4,138,165 | 2/1979 | Blomberg et al. | 303/115 |
| 4,275,934 | 6/1981 | MacDonald | 303/119 |

FOREIGN PATENT DOCUMENTS 1585646  3/1981  United Kingdom .

Primary Examiner—Duane A. Reger
Attorney, Agent, or Firm—Edwin E. Greigg

[57] ABSTRACT

A pressure modulator for anti-skid systems in vehicle brake systems, including a plunger/cylinder assembly actuatable merely by supplying electrical auxiliary energy and in the form of a linear actuator is incorporated into a hydraulic or pneumatic pressure line between a master brake cylinder and at least one associated wheel brake cylinder in such a way that upon the onset of ABS functions a pump plunger is displaced by a linear motor action in such a way that fluid pressure arriving from the master brake cylinder is counteracted while the wheel brake cylinder pressure is simultaneously relieved. By appropriate design including a double check valve, ASR functions (anti-slip regulation) are also attainable, for which the pressure modulator can be mounted directly in an appropriately shaped housing recess of a brake caliper such as that of a disk brake.

23 Claims, 5 Drawing Figures

PRESSURE MODULATOR FOR ANTI-SKID BRAKE SYSTEMS

BACKGROUND OF THE INVENTION

The invention is based on a pressure moderator for anti-skid hydraulic brake systems (ABS systems). Hydraulic brake systems, for instance also having multicircuit tandem master brake cylinders, are known (German Offenlegungsschrift No. 27 23 734); it is also known to provide such brake systems with anti-skid braking (ABS) functions, for example incorporating electrically actuatable multi-position magnetic valves, which realize the desired and necessary ABS control functions, in the outgoing brake pressure lines leading to the wheel brake cylinders, a pressure drop operation is such that the particular pressure line from the master brake cylinder to the associated wheel brake cylinders is at least interrupted and pressure fluid delivered to the return system. If a renewed pressure rise is desired, then communication with the master brake cylinder is reestablished, along with arbitrary pressure/time courses, and with the option of realizing functions of keeping pressure unchanged, without either a rise or a drop. Realizing ABS functions in this way, with the aid of electrically actuatable multi-position magnetic valves in the main brake lines, can be problematic, because brake medium or brake fluid that is under pressure is practically "lost" and must be pumped back up again later, in the area of a pressure supply apparatus having a pump, a pressure storage tank and appropriate pressure switches, to the high pressure that is required for the braking process. Furthermore, it is also necessary to design such systems, which effect an interruption of the brake lines and an outflow of the pressure fluid in them, very reliably and in a very fail-safe manner, so that if a failure occurs there will be no danger that too much high-pressure brake fluid will be drained out.

In the field of realizing ABS functions, it is also known (U.S. Pat. Nos. 3,690,736 and 3,371,979) to attach a parallel branch in the lines leading from the master brake cylinder to the various wheel brake cylinders, and to connect this branch with a chamber which is variable, by means of an electrically actuatable cylinder-piston assembly, in accordance with the triggering of an actuating coil counter to the pressure of a spring, so that a volume of pressure can be removed from and then returned to the brake line again; this is known as the basic plunger principle. In this case, although the brake circuit again remains closed, means are still required for interrupting the further delivery of highpressure brake pressure fluid from the master brake cylinder during ABS functions, so that the removal of pressure fluid can become at all operative. This interruption can also be made possible by providing (U.S. Pat. No. 3,690,736) that the retreating plunger simultaneously liberates a ball valve so as to close the master brake cylinder feed line. However, if the system fails at this point, then it is no longer possible to generate any braking pressure at all from the master brake cylinder, that is, by actuating the brake pedal.

In a brake actuating apparatus for a vehicle brake system, it is known (European Pat. No. 0025714) for at least one reservoir and one electrically actuatable valve, and preferably a pump for filling the reservoir as well, to be incorporated directly into the brake actuating apparatus, embodied by a caliper, for instance for a disk brake. By suitable miniaturization, the result is a combination brake pressure modulator and caliper, and an additional function of this combination is also to detect any possible locking or skidding states of a particular braked wheel and then to actuate the integrated valve in such a way as to prevent locking or skidding (ABS).

OBJECT AND SUMMARY OF THE INVENTION

It is accordingly an object of the present invention on the one hand to keep the brake circuit completely closed even when realizing ABS functions, but on the other hand to assure that if there should be a component failure, even in the electrical system, the normal brake functions can continue to be performed, and by augmenting the system it should also be possible to perform so-called ASR functions, that is, anti-slip regulation.

The invention attains this object with the characterizing features set forth hereinabove and has the advantage that pressure medium is not drawn parallel from the hydraulic brake pressure lines leading to the wheel brake systems upon the onset of ABS functions, but instead, without interrupting these main brake lines, operation is counter to the pressure arriving from the master brake cylinder, depending on the course of the ABS functions over time; that is, the wheel brake cylinder region is pressure-relieved, and the actuation is purely electrical, so that if there is a failure the usual brake functions are still attainable at any time.

The pressure modulation for the ABS functions is effected not in the vicinity of the master brake cylinder, but solely and preferably closely adjacent to the particular wheel brake cylinder, thereby obviating many mechanical parts of present systems. Without having to make a detour via hydraulic systems, the power electronics effecting the displacement of the so-called pressure relief plunger are connected directly to the controlling electronics, which are always kept up to date in terms of the status of data on the particular ABS function required, so that an immediate reaction in pressure modulation is possible based on the pertinent sensor data. It is particularly advantageous that continuous control, relief and elevation of pressure medium can be performed, instead of merely abrupt switchovers from one to another of the various ABS functions (pressure reduction, pressure maintenance, pressure elevation). The embodiment of the pressure modulator according to the invention is selected such that without limiting its essential functions, a direct integration of the modulator into the brake caliper of a wheel brake cylinder assembly is possible, as a result of which it is possible to minimize additional brake fluid volume in the modulator, with direct, fast reaction of the brakes, because the rigidity of the system increases considerably in terms of volumetric variations. Furthermore, as a result the required modulation energy is reduced so decisively that the entire region for performing ABS or ASR functions can be decentralized to the wheel brake cylinder region, while eliminating a previously required but sometimes considerable expenditure for construction and for components and thereby enabling a decisive cost reduction.

A further advantage is that the particular brake circuit remains completely closed, despite the effective realization of ABS functions and even of ASR functions, which are equally possible because of the design of the pressure modulator according to the invention, and pressure medium is not drained out, nor is the amount of pressure medium available reduced by a removal of some volume. There is therefore no necessity for replacing pressure medium that would have been lost because of a separate pump.

Still another advantage is that the particular pressure modulators, which are made of simple parts and are comparatively small in size and not at all delicate, can be disposed anywhere in the brake system, as desired; if they are close to or, as noted, integrated into the vehicle brakes, then only slight variations in volume are required to attain a desired pressure change. This means that small plunger cross sections and short strokes are sufficient, a factor which is of not only general significance but is particularly important in air brakes.

Yet another advantage is that the brakes, that is, the master brake cylinder, can be relieved at any time by means of a check valve, so that whenever the check valve springs are dimensioned such that they are easy-running, there will be no reason for excessive brake counterpressure.

If, whenever ABS functions do not have to be realized, the coil winding of the pressure modulator is not excited, then brake fluid can be forced through the modulator without difficulty, so that the brakes can be bled, for instance to remove air bubbles in a hydraulic medium. Upon brake actuation, the armature or plunger in the pressure modulator moves downward, under some conditions even so far that slits enable the flow of brake fluid past the plunger. In this process, the plunger is kept approximately centered in a simple manner by means of two pre-stressing springs.

The characteristics of the invention enable still further development and improvement of the pressure modulator defined herein. A particularly advantageous feature is to dispose the power coil which actuates the armature such that it is in good thermally conductive contact with an outer housing, so as to prevent excessive heat buildup.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
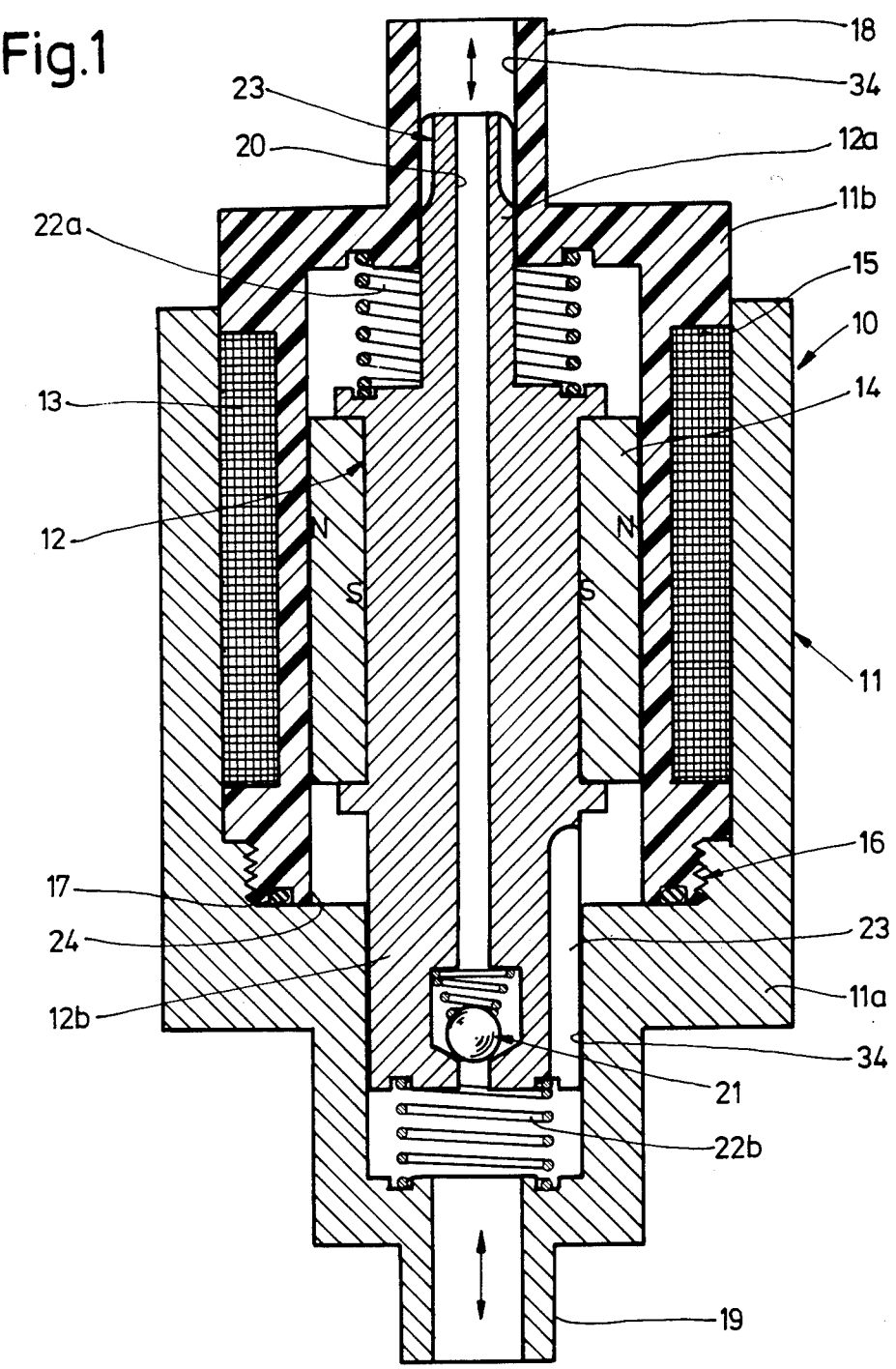
FIG. 1, in longitudinal section, shows a first exemplary embodiment of a pressure modulator according to the invention for incorporation into the master brake cylinder of a vehicle, along with brake pressure lines joining the various wheel brake cylinders.

The pressure modulator shown in the drawing is embodied such that when incorporated in the hydraulic brake pressure line to a wheel brake cylinder, it can generate a pressure difference between the pressure that the operator of the vehicle produces, for instance in emergency braking, and the actual required brake pressure that is exerted upon the wheel so that the wheel is just prevented from locking (that is, it is allowed to be just below the limit where it would start to skid). This desired pressure difference, which can in principle take an arbitrary course which corresponds to typical ABS function courses, is generated by a pressure modulator in the form of what can be called in simple terms a plunger-cylinder assembly and which has the properties of a so-called linear actuator. The pressure modulator 10 includes an outer cylindrical housing 11, which in turn comprises two cup-shaped interconnected parts, namely an outer part 11a and an inner part 11b, as well as an armature or plunger 12 which is displaceable, under the influence of supplied auxiliary electrical energy, in this housing, the housing forming an inner cylindrical sliding face.

The properties of this linear actuator result from the provision, first, of a winding coil 13 generating a predetermined magnetic force and reacting electromagnetically to the presence of permanent magnets 14, displacing them according to the magnetic flux they generate; in principle, it is arbitrary whether the winding is associated with the housing and the permanent magnet is associated with the armature, or vice versa. In the exemplary embodiment shown, the winding coil 13 is disposed in an elongated annular recess 15 in the inner housing part 11b and the latter is then inserted into the outer housing part 11a receiving it, preferably being screwed together with its as shown at 16. For sealing purposes, an O-ring or some other suitable seal 17 is also provided. An upper connection pipe 18, as seen in the drawing, is formed by the inner housing part 11b and communicates with the brake pressure line coming from the master brake cylinder, while a lower connection pipe 19 is formed by the outer housing part 11a and advantageously communicates over the shortest possible route with the brake line leading to an associated wheel brake cylinder.

The armature or plunger 12 in this pressure modulator assembly acts, in terms of its function, as a pump piston; to this end, the action of the soft iron material making up the plunger 12 is further reinforced by permanent magnets 14 disposed on it, which may either form a cylindrical permanent magnet ring or may comprise individual segments of simple shape, which are joined to the plunger or armature in a simple manner, for instance being glued thereto, with an epoxy resin or the like. It is recommended that the magnet or magnets be selected with high coercivity, for instance comprising a material like samarium cobalt or neodymium, and to increase the magnetic forces effecting the displacement of the pump piston the outer housing 11a may also be made of soft iron while in that case the iner housing 11b is preferably of a nonmagnetic material.

The structure of the pressure modulator shown in the drawing is completed by an opening 20, which for instance is centrally located, through the plunger 12, in which a check valve 21, in its embodiment as a spring-biased ball valve, is inserted at a suitable point, for instance farther down as seen in the drawing. In response to pressure arriving from the master brake cylinder via the opening 20, the check valve 21 closes whenever the pressure on the other side is lower. The plunger 12 is retained and kept approximately centered in a desired basic position by means of two pre-stressing springs 22a, 22b disposed on both sides. At both of its ends the plunger 12 forms sliding guidance portions of offset diameter, which are hereinafter called guide plungers 12a, 12b and are retained and supported in a slidably displaceable manner in cylindrical sliding guides 12a', 12b', of correspondingly reduced diameter, of the inner and outer housing 11b and 11a shown in FIG. 3. Finally, where the guide plungers 12a, 12b having the narrowed diameter of the plunger 12 merge with the correspondingly narrowed cylindrical guides of the inner and outer housing 11a and 11b, there are also bypass-like pressure medium throughput slits 23, each extending up to a predetermined height, which enable bleeding of the brake elements located in the region of the wheel brake cylinder. Among these are also the arrangement of the plunger 12, or of the ring magnet 14 or the various magnet segments, in such a manner that a flow of the pressure fluid is possible along the surfaces between the magnet 14 and the central bore 24 of the inner housing part 11b, so that precise tolerances need not be adhered to in this area. The central portion 12, 24 forms the linear actuator.

The basic function during normal braking is such that the plunger 12 is displaced downward, as seen in the drawing, by the pressure arriving from the master brake cylinder, causing the buildup of a corresponding wheel brake cylinder pressure and providing the opportunity of pressure equalization via the check valve 21, so that the pressure arriving from the master brake cylinder is always equal to the brake pressure present at the associated wheel brake cylinder.

If anti-skid or ABS functions arise, then the actual brake pressure present at the wheel brake cylinder can be controlled continuously by the pressure modulator according to the invention, in accordance with a desired pressure function course. The fundamental function course is such that upon excitation of the coil for triggering the variable actuating current, a semiconductor electronic system is preferably used, the plunger 12 is pressed upward counter to the brake pressure arriving from the master brake cylinder, and with the simultaneous closure of the check valve 21, additional volume for the pressure fluid is made available on the wheel brake side, with a corresponding pressure reduction; depending on sensor data, an immediate transition and switchover is also possible, with a corresponding pressure increase, or a predetermined pressure maintenance position can be continuously entered and maintained. The modulation volume is generated as shown from the upper guide plunger 12a, that is, the one nearer the master brake cylinder, to the master brake cylinder. It is therefore also possible to perform a new pressure modulation, as it were, during ABS functions within the scope of the invention, because it is no longer necessary to operate in a "stuttering" manner, making sudden switches back and forth between full brake pressure and pressure relief. The invention also enables a slow rise or fall to precisely the pressure level that with optimal braking action brings about a status in which wheel locking just barely does not yet occur.

It is recommended that the pressure modulator according to the invention be disposed as close as possible to the wheel brake cylinders, so that for effective pressure modulation only small changes in volume are necessary. The amount of energy required is therefore slight as well, because both the plunger diameter and the stroke of the plunger can be kept small; hence the design and compass of the complete pressure modulator are attainable with only a small structural size, because the stroke of the linear actuator, multiplied by the end surface area of guide plunger 12a corresponds to the volumetric change in a given brake line.

Since, as shown, the coil winding 13 is in good thermal conductive contact with the outer housing, no thermal problems arise here, either; furthermore, the apparatus is failsafe in this sense, because if the electrical supply fails the normal braking behavior is maintained unchanged.

Solely for the instance in which the coil 13 is constantly excited, which in practice is virtually not expected to arise, it may be desirable to embody the leakage capacity in the vicinity of the guide plunger 12a in such a way that after a relatively short time, for instance a few seconds, enough brake fluid will have flown into and through the vicinity of the pressure modulator that the brakes can function in the usual manner. This opportunity can be provided without difficulty by designing the components accordingly; as a result, the need for additional redundant error circuits also remains low. Since ABS functions typically operate with a plurality of cycles per second, they are not affected by the above-mentioned controlled leakage capacity, which is in the 1 Hz range.

Figure 2:
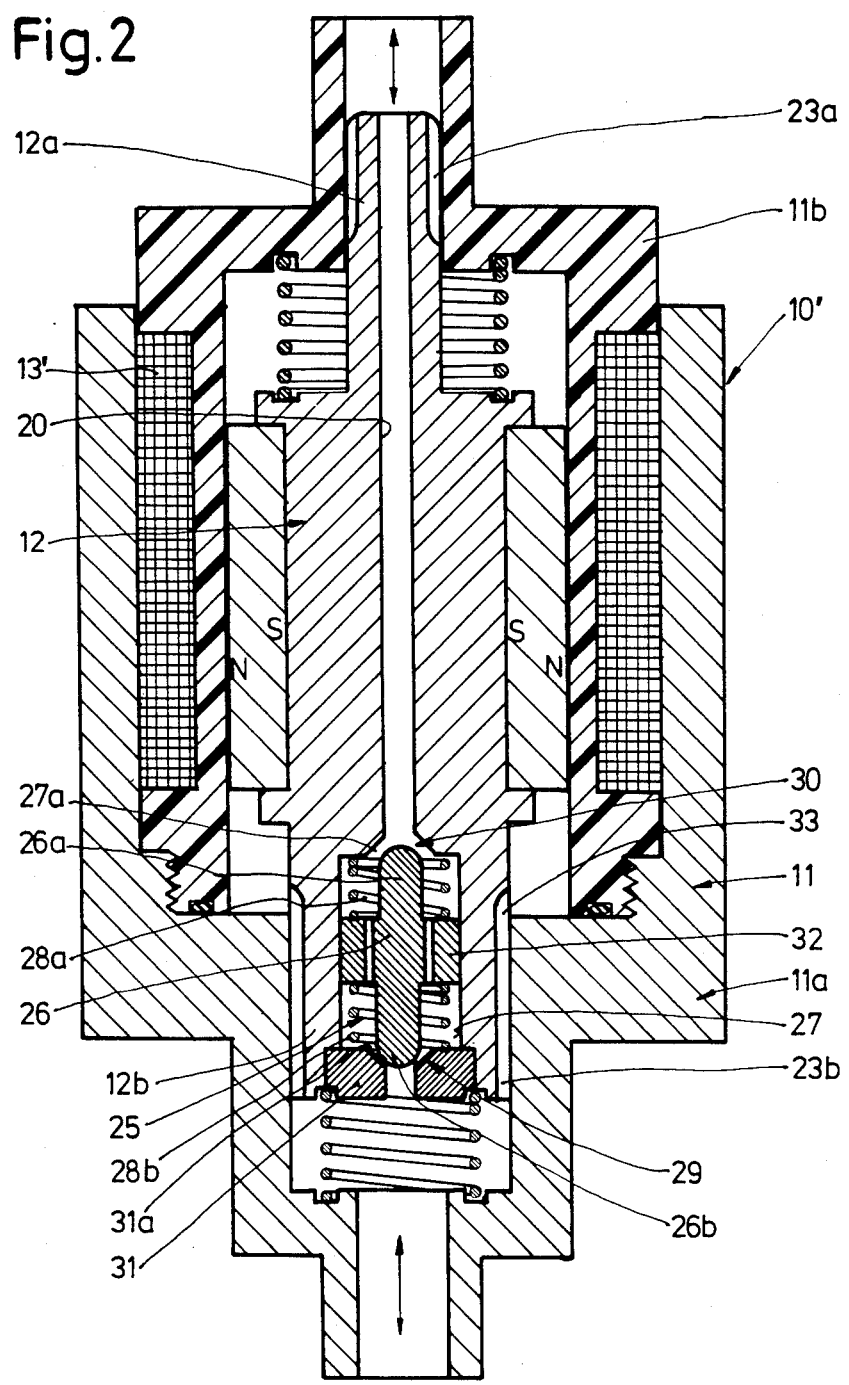
FIG. 2 shows a pressure modulator similar to the embodiment shown in FIG. 1 but intended for additionally realizing ASR functions.

The embodiment of the pressure modulator according to the invention as shown in FIG. 2, which is only slightly modified from that of FIG. 1, additionally enables the realization of so-called ASR functions (anti-slip regulation), made possible by the inversion of the ABS function principle, by exerting pressure in the direction toward the wheel brake cylinder and modulating it accordingly by means of a suitable design and actuation of the linear actuator.

In FIG. 2, elements identical to those in the embodiment of FIG. 1 are provided with the same reference numerals, while elements that have undergone modification in terms of structure and function have the same reference numeral with a prime.

In the lower portion of the plunger 12, which with its middle portion forms the linear actuator and in that portion could also be called an armature plunger, there is a double check valve 25, which is capable of closing on both sides, that is, toward the master brake cylinder (upward in the drawing) and toward the wheel brake cylinder (downward in the drawing) and comprises a valve member 26. The valve member is supported in a slidably displaceable manner in an enlarged sliding guide bore 27 in the lower guide plunger 12b and is kept in its middle position, and hence open, by two prestressing springs 28a, 28b, one on each side and each engaging a shoulder. With an appropriately formed end region 26a and a conical seat 27a toward the longitudinal plunger conduit 20, the valve member 26 forms a first closure seat 30, and with its lower end portion 26b and a seat 31a formed by an insert 31 in the lower guide plunger 12b, it forms a second closure seat 29. Furthermore, the valve member 26 includes longitudinal throttle bores 32, which join the valve pressure chambers on either side with one another.

For additionally realizing ASR functions, the following mode of operation is accordingly attained:

The armature (plunger) 12 or linear actuator is electromagnetically moved downward in the plane of the drawing, that is, toward the respectively associated wheel brake cylinder, by appropriate actuation of the coil 13'; in this case, a farther downwardly extending control edge, or edges, 33 of the bypass throughput slits 23b in the lower guide plunger 12b and the double check valve close off the volume toward the wheel brake cylinder. As a result a corresponding pressure can build up; the valve member 26 of the double check valve 25 rests in this case (ASR function) on the upper seat 27a. Depending on the algebraic sign (+ or −) of the pressure difference ΔP located above the double check valve 25, the throttling action of the longitudinal conduits 32 effects contact with the upper seat 27a or the lower seat 31a, while in the event of ABS functions the valve member 26 rests on the lower closure seat 29.

It is also within the scope of the invention to use a pressure modulator embodied as shown in FIG. 2 solely as an ASR modulator, in which case the low force requirement of the electromagnetically actuated (armature) plunger 12 is advantageous. Thus the same advantages in terms of safety are attained for realizing ASR functions as are attained for the ABS functions that can be realized with the pressure modulator according to the invention.

Both embodiments are also suitable for an expanded field of application, which is that even in normal braking a pressure modulator of this kind can advantageously be used to attain predetermined brake pressure distributions and actions, for instance as a function of suitable sensor signals. For instance, such pressure modulators in the brake lines or directly on the brake calipers can be provided with sensor signals relating to spring action resulting from load conditions (dynamic operating characteristics), or relating to corresponding axle loads, especially in the rear axle region (static operating characteristics). In this way, appropriate triggering of the pressure modulators can then be effected while driving so as to effect an optimal distribution of braking force. As a result, it is possible to perform a pressure reduction adaptively and in an intended manner even during normal operation, using the ABS modulator, or in critical conditions to correct the brake layout of the vehicle, which may be dictated by aging of the brake system.

Figure 3:
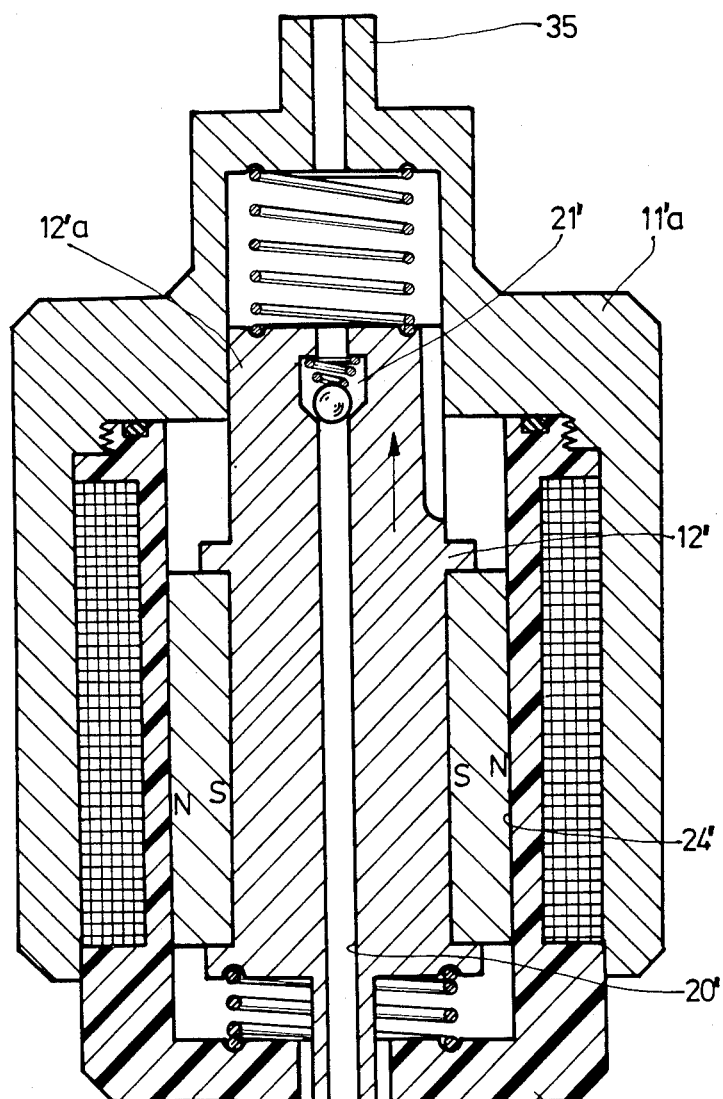
FIG. 3 along with FIG. 3a shows a further embodiment of a pressure modulator, in which the oil volume bwetween the pressure-modulating plunger portion and the wheel brake region is minimized, with FIG. 3a showing a different disposition of a conduit leading to a check valve.
Figure 4:
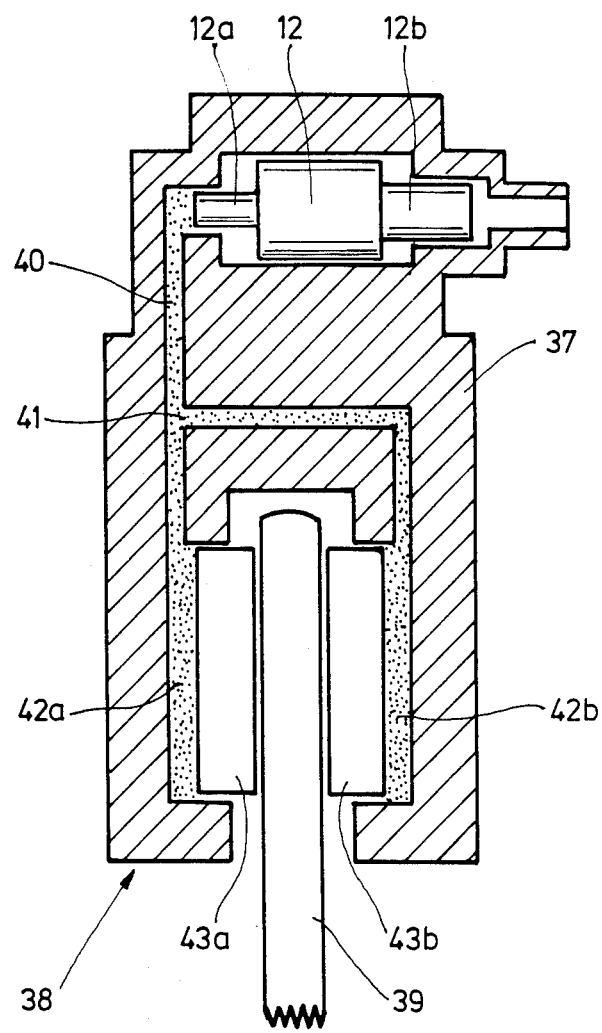
FIG. 4 shows a possible embodiment for the direct inclusion of the pressure modulator according to the invention in the structural region of a brake caliper; this pressure modulator is shown only schematically in this figure but may take the form of any of the embodiments shown in FIGS. 1-3.

The exemplary embodiment of a pressure modulator shown in FIG. 3, because of its small dimensions, is suited particularly for being directly mounted on or installed in the area of the brake caliper, preferably directly in the brake caliper as shown in greater detail in FIG. 4.

The basic structure and function of the exemplary embodiment shown in FIG. 3 correspond to the exemplary embodiments of FIGS. 1 and 2, with the same possibilities of functional expansion and with the only difference being that here the outer housing 11'a forms the pipe 35 leading to the master brake cylinder, and the inner housing 11'b, of nonmagnetic material, forms the pipe 36 leading to the respective wheel brake cylinder. It will be understood in this connection that these housing concepts and the embodiment of the pipes are relative, if the pressure modulator as a whole is part of a brake caliper, such as in disk brakes (FIG. 4).

In the exemplary embodiment of FIG. 3, the lower guide plunger 12'b forms the pressure-modulating plunger in realizing ABS or ASR functions, as shown. In the middle position of the (armature) plunger 12' with its guide plungers 12'a and 12'b on both sides, as the drawing shows, the lower guide plunger 12'b, which is oriented toward the associated wheel brake cylinder, is sealed off, so that the volume of the hydraulic pressure medium between the pressure-modulating plunger 12'b and the plunger or plungers in the wheel brake cylinder, which acuate the brakes, is kept particularly small. As a result, it is also possible to reduce the necessary stroke and the modulation energy required, so that small plunger dimensions and low actuating forces are sufficient. The check valve 21' is located at the upper end of the upper guide plunger 12'a and at least in this embodiment, closes the central opening 20' in the plunger 12' in order to realize ABS functions (naturally, it may also be embodied as a double check valve, for realizing ASR functions as well).

Figure 3A:
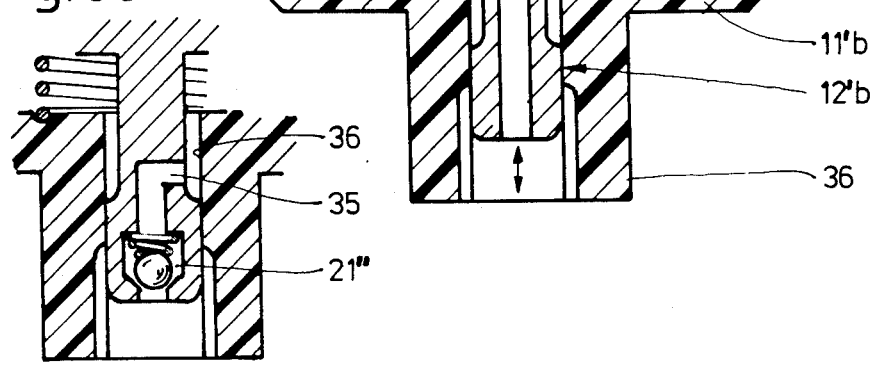

In the alternative embodiment of FIG. 3a, of which only the vicinity of the check valve is shown, this check valve 21" is again disposed in the lower portion of the lower pressure-modulating plunger 12'b and with the central opening 20' being omitted joins the valve chamber, via a short transverse conduit 35 and via longitudinal slits or an annular recess 36 in the upper portion of the lower guide plunger 12'b, with the bore 24', having tolerance a spacing within the inner housing and leading on to the connection of the master brake cylinder.

In a preferred embodiment of the present invention, a thus miniaturizable pressure modulator is suitable for cost-saving and effective mounting directly in the vicinity of the caliper 37 of a disk brake 38, the brake disk being shown at 39 (see FIG. 4). In this way, there is a minimal volume of pressure medium that has to be controlled for a given brake, so that to attain even comprehensive pressure variations only comparatively very slight volumetric variations (of only 1 $cm^3$ or less, for example) are needed, so that both the plunger area (that is, the operative plunger surface area) and the electrical forces required for modulation can be minimal.

In the exemplary embodiment of FIG. 4, the linear actuator, comprising the central armature plunger 12 and the guide plungers 12a, 12b on both sides are preferably installed crosswise in an upper portion or extension, forming a corresponding housing recess, of the caliper 37 of the disk brake 39, and inner conduits 40 branching at 41 and ensuing conduit segments 42a, 42b direct the pressure medium to the brake pads 43a, 43b on both sides. As a result, that is, by the disposition of the modulator as close as possible to or directly in the brake caliper, the volume ΔV of pressure medium that has to be modulated is reduced, as will be apparent, and thus the energy required for modulation is reduced correspondingly.

All the characteristics discussed in the specification, shown in the drawing and recited in the claims may be of the essence of the invention, either singly or in any arbitrary combination.

The foregoing relates to preferred embodiments of the invention, it being understood that other variants and embodiments thereof are possible within the spirit and scope of the invention, the latter being defined by the appended claims.

What is claimed and desired to be secured by Letters Patent of the United States is:

1. A pressure modulator for a motor vehicle brake system actuated via a pressurized brake fluid and including a master cylinder and at least one wheel brake, comprising a pressure-tight housing including means defining a pump cylinder disposed between said master cylinder and said at least one wheel brake, said pump cylinder provided with a pump plunger longitudinally displaceable therein forming an armature, said armature encompassed by a surrounding electromagnetic coil disposed securely in said housing, at least part of said armature being comprised of a polarized permanent magnet operable for displacement by an exciter current supplied to said electromagnetic coil further to displace the pump plunger in a first direction to force brake fluid to flow to at least one driven wheel associated with a wheel brake, which driven wheel is tending to spin due to excessive drive mount applied thereto, whereby the rising brake fluid pressure in said wheel brake causes wheel spin thereof to be reduced.

2. A pressure modulator as defined by claim 1, further comprising compression springs oppositely disposed in the pressure modulator serve to retain the plunger in a middle position, the pump plunger being displaceable therefrom by means of the armature in the first direction to increase brake pressure to the first at least one wheel brake associated with a driven wheel tending to spin from drive torque and in a second, opposite direction to decrease brake pressure to at least one wheel brake associated with a wheel locked during braking from excess force and the electromagnetic coil can additionally be subject to a exciter current to displace the armature in said second direction, whereby anti-lock braking and anti-slip regulation can be provided.

3. A pressure modulator as defined by claim 1, in which said plunger is provided with end faces of different diameter, a first end face being smaller and adapted to perform pumping work, a second end face being larger and adapted to serve as a component of a control valve assembly.

4. A pressure modulator as defined by claim 1, in which said housing comprises an outer cup-shaped housing part and an inner cup-shaped housing part, which parts nest in one another in telescoping fashion and are fixedly secured to one another, and said coil means is supported in a recess in said inner housing part.

5. A pressure modulator as defined by claim 4, in which said inner part forms a cylindrical sliding face for said plunger and receives said coil means.

6. A pressure modulator as defined by claim 4, in which said plunger includes guide plungers of different diameter which effect support and guidance of said plunger and which guide plungers slide in correspondingly associated cylindrical guide faces of said inner and said outer housing parts.

7. A pressure modulator as defined by claim 1, in which said plunger supports said permanent magnet on its circumference.

8. A pressure modulator as defined by claim 2, in which compression springs that are provided to center said plunger in a predetermined middle position.

9. A pressure modulator as defined by claim 1, in which said plunger is provided with end faces of different diameter, a first end face being smaller and adapted to perform diameter, a first end face being smaller and adapted to perform pumping work, a second end face being larger and adapted to serve as as displacement guidance element for said armature.

10. A pressure modulator as defined by claim 2, in which said housing comprises an outer cup-shaped housing part and an inner cup-shaped housing part, which parts nest in one another in telescoping fashion and are fixedly secured to one another, and said coil means is supported in a recess in said inner housing part.

11. A pressure modulator as defined by claim 10, in which said inner housing part forms a cylindrical sliding face for said plunger and receives said coil means.

12. A pressure modulator as defined by claim 10, in which said plunger includes guide plungers of different diameter which effect support and guidance of said plunger and which guide plungers slide in correspondingly associated cylindrical guide faces of said inner and said outer housing parts.

13. A pressure modulator as defined by claim 12, in which a modulation volume of brake fluid required for realizing ABS and ASR functions is effected by means of said guide plungers and wherein a central portion of said plunger forms a linear actuator.

14. A pressure modulator as defined by claim 12, in which said cylindrical guide faces include upper and lower longitudinal bypass slits extending to selectively predetermined heights and said inner housing part includes a central bore for brake bleeding.

15. A pressure modulator as defined by claim 10, in which said plunger includes a throughput opening, a double check valve is disposed in said throughput opening between an inlet and an outlet of the pressure modulator and said double check valve has a closure action oriented toward the master brake cylinder and toward the wheel brake cylinder.

16. A pressure modulator as defined by claim 14, in which said lower longitudinal by pass slits include control edge in said plunger which are dimensioned to close said lower longitudinal by pass slits upon the onset of ASR functions, and said upper longitudinal bypass slits are disposed in an upper end of said plunger to be acted upon by the pressure of the master brake cylinder during a downwardly oriented movement of the plunger and thus said upper longitudinal bypass slits do not open entirely prior to closure by said lower control edges, whereby air bubbles present in the brake pressure fluid in said pressure modulator or wheel brakes may be evacuated from said brake system.

17. A brake pressure modulator as defined by claim 15, in which said double check valve includes a valve member retained in a middle position, open to both sides, by means of pre-stressing springs on opposite ends, which valve member closes in a direction of the master brake cylinder or the associated wheel brake cylinder depending upon an algebraic sign (+ or −) of an operative pressure difference ($\Delta P$).

18. A pressure modulator as defined by claim 17, in which said valve member of the double check valve has longitudinal throttling conduits.

19. A pressure modulator as defined by claim 8, in which in said middle position of said plunger, the lower guide plunger oriented toward the associated wheel brake cylinder is sealed off in its sliding guide and in the event of operative armature movements caused by ABS functions said plunger becomes a pressure-modulating plunger for the wheel brake cylinder, such that a volume of pressure medium between said plunger and the wheel brake cylinder piston is minimal.

20. A pressure modulator as defined by claim 19, in which said check valve in said plunger communicates via a short transverse conduit with an inner housing bore and communicates via this bore and longitudinal bypass slits in said plunger with the master brake cylinder.

21. A pressure modulator as defined by claim 20, in which said plunger is mounted directly in a brake caliper, as an integrated component.

22. A pressure modulator as defined by claim 21, in which said brake caliper includes an integral extension which forms a housing recess which receives said plunger along with guide plungers in the vicinity of which recess, an electrical actuating coil for said plunger is disposed.

23. A pressure modulator as defined by claim 22, in which said plunger with its guide plungers on its sides is supported such that it is slidable in a transverse direction in said housing recess formed by the extension of the brake caliper and is in operative connection via a pair of inner conduits with oppositely disposed brake plungers.

* * * * *